Nov. 2, 1965     D. R. HUFF     3,215,576
METHOD OF MAKING CONTAINERS OF BONDED FIBERGLASS
Filed Dec. 11, 1962     3 Sheets-Sheet 1

Inventor
Donald R. Huff
By Wallace, Kinzer and Dorn
Attorneys

Nov. 2, 1965  D. R. HUFF  3,215,576
METHOD OF MAKING CONTAINERS OF BONDED FIBERGLASS
Filed Dec. 11, 1962  3 Sheets-Sheet 2
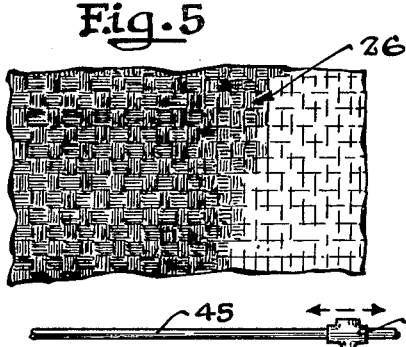
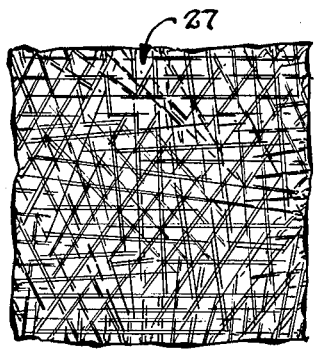
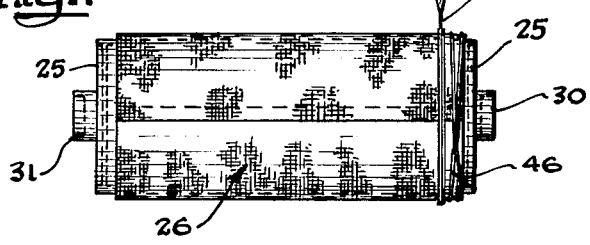
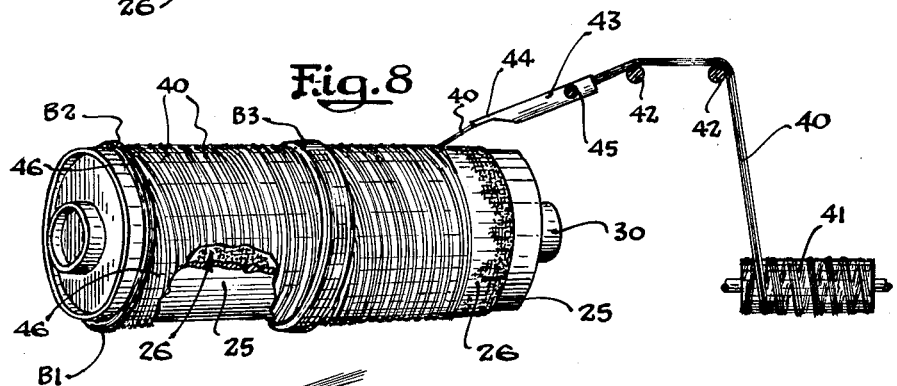
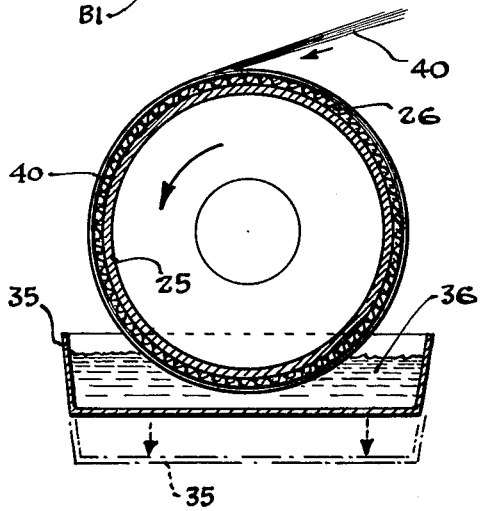
Inventor
Donald R. Huff
By Wallace, Kinzer and Dorn
Attorneys Nov. 2, 1965 D. R. HUFF 3,215,576
METHOD OF MAKING CONTAINERS OF BONDED FIBERGLASS
Filed Dec. 11, 1962 3 Sheets-Sheet 3
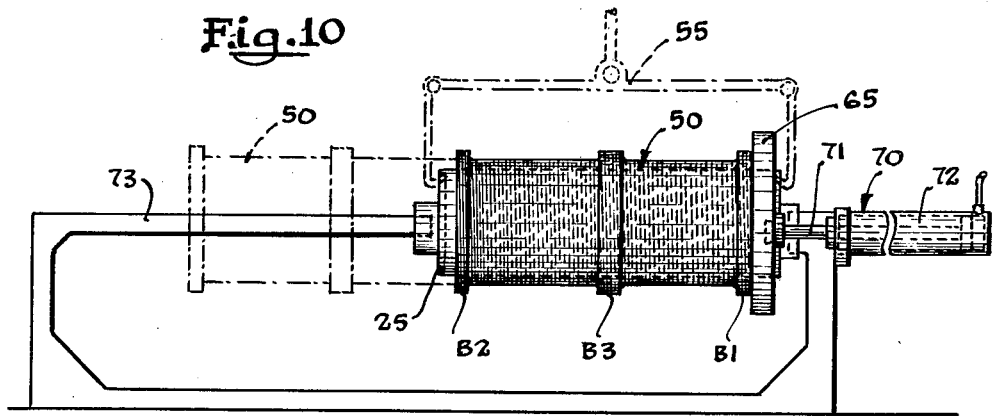
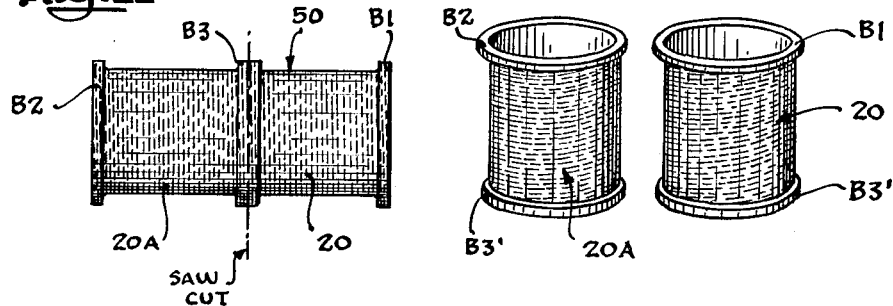
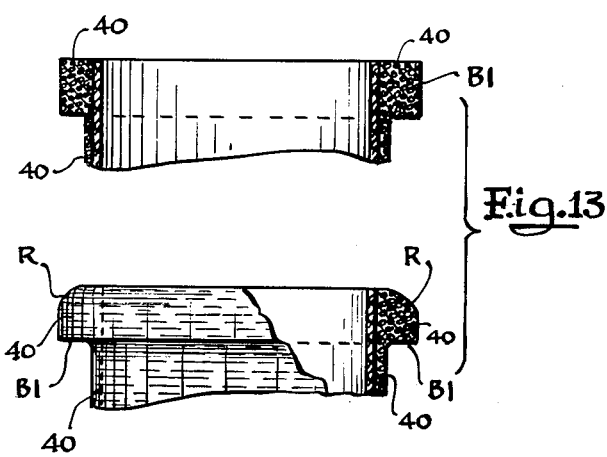
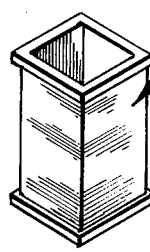
Inventor
Donald R. Huff
By Wallace, Kinzer and Dorn
Attorneys United States Patent Office 3,215,576
Patented Nov. 2, 1965

3,215,576
METHOD OF MAKING CONTAINERS OF
BONDED FIBERGLASS
Donald R. Huff, Springfield, Mo., assignor to Ozark Reconditioning Company, Springfield, Mo., a corporation of Missouri
Filed Dec. 11, 1962, Ser. No. 243,776
2 Claims. (Cl. 156—162)

This invention relates to the production of containers composed entirely of bonded fiberglass.

Fiberglass as a material would afford a highly desirable food container because of the characteristic feature of glass to display no influence on the taste of a food product, even during periods of prolonged storage. The packaging of food is but one example of the neutral or unsapid attribute presented by glass fibers, since it is common knowledge that glass as a container is chemically neutral as well, and hence is useful as a container for virtually any product which is to be maintained in a pristine state.

Of primary concern in the present instance is the production of fiberglass containers of relatively large size, and it is an object of the present invention to enable these to be produced rapidly and inexpensively and in an accurately controlled manner so that maximum strength is achieved. Specifically, it is an object of the present invention to afford a glass container of cylinder-like form consisting of a glass mat or sheet liner wound tightly under compression by a glass fiber roving so that the liner is a compression-molded element, the mat interior or liner and the roving exterior or casing being permanently and homogeneously integrated by a binder resin present in a minimum amount. Being compression-molded, the liner is devoid of a bonding cement content save that sufficient to permanently bond the liner and casing. Thus, one of the important objects of the present invention is to achieve maximum strength in a glass fiber container by joining the glass fiber mat and the glass fiber roving with the minimum amount of resinous cement or binder. Another object of the present invention is to form the container with end beads of the usual enlarged diameter imparting increased strength to the ends of the container and enabling end caps to be applied thereto.

Other and further objects of the present invention will be apparent from the following description and claims and are illustrated in the accompanying drawings which, by way of illustration, show preferred embodiments of the present invention and the principles thereof and what is now considered to be the best mode contemplated for applying these principles. Other embodiments of the invention embodying the same or equivalent principles may be used and structural changes may be made as desired by those skilled in the art without departing from the present invention.

In the drawings:

FIGS. 5 and 6 are fragmentary plan views of fiberglass sheets of different forms that may be used in constructing the container of the present invention;

FIG. 7 is a view illustrating the lapping of the mat on the mandrel on which the container is formed;

FIG. 8 is a view illustrating the manner in which the roving is wound on the sheet;

FIG. 9 is a sectional view of the mandrel showing the fiberglass sheet and related roving;

FIG. 10 is a view illustrating the manner in which a container constructed under the present invention is removed from the mandrel after curing;

FIG. 11 is a view of the container in the state it is in after removal from the mandrel;

FIG. 12 is a perspective view of twin containers cut from the single body shown in FIG. 11;

FIG. 13 illustrates the final machining operations to be performed on the end beads; and FIG. 14 shows another form of container possible under the present invention.

Figure 1:
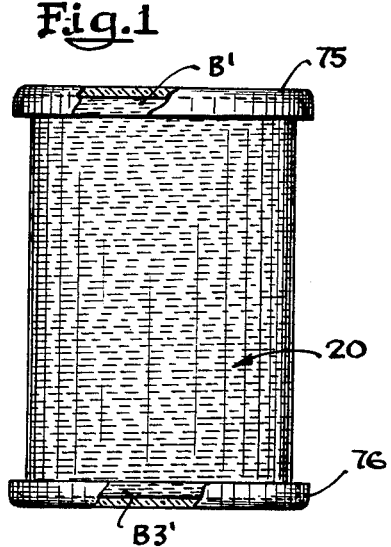
FIG. 1 is a side elevation of a barrel-type container constructed under the present invention.

The present invention relates to production of cylinder-like containers of fiberglass of which the geometry of the truly cylindrical container illustrated at 20 in FIG. 1 is typical. The container 20 consists of a fiberglass liner 21, FIG. 2, initially in sheet form, and the exterior or casing portion consisting of a glass fiber roving wound about the sheet 21 under tension, as explained hereinafter. Thus, with the exception of the bonding cement or binder, a container produced under the present invention, including the beads that are characteristic of a barrel-type container, is composed entirely of glass.

High strength and maximum density are achieved under the present invention by winding the exterior roving about the liner sheet under tension while the binder resin content in the sheet is still moist or flowable, thereby squeezing out or expressing excess binder, an excess of which results in a physically weak container. Thus, high strength is a direct function of the proportion of glass content, or in other words, varies inversely with binder resin content. In fact, the present containers as produced are so strong that a fifty-five gallon drum produced hereby, with an I.D. of twenty-two and one-quarter inches will, when placed on its side, flex without breaking under a one-ton compression load.

Figure 4:
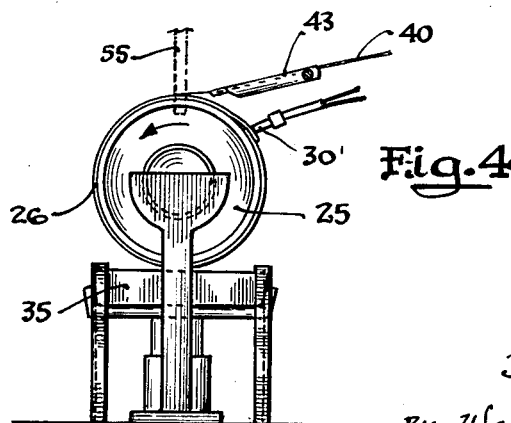
FIG. 4 is an end view of the apparatus illustrated in FIG. 3.

The initial production step under the present invention is to apply a fiberglass sheet to a molding mandrel or drum 25, FIG. 4, the exterior geometry of which corresponds to the desired internal geometry for the finished container. The glass fiber sheet may be of woven form 26, FIG. 5, or of mat form 27, FIG. 6, but in any event, the sheet is of such width as to be capable of having the ends thereof overlapped on the mandrel and joined in such overlapped state, as by a heat seal rod 30' of any desired form for effecting the heat seal splice. Other means can of course be used for joining the ends of the sheet to secure the same on the molding mandrel.

Figure 3:
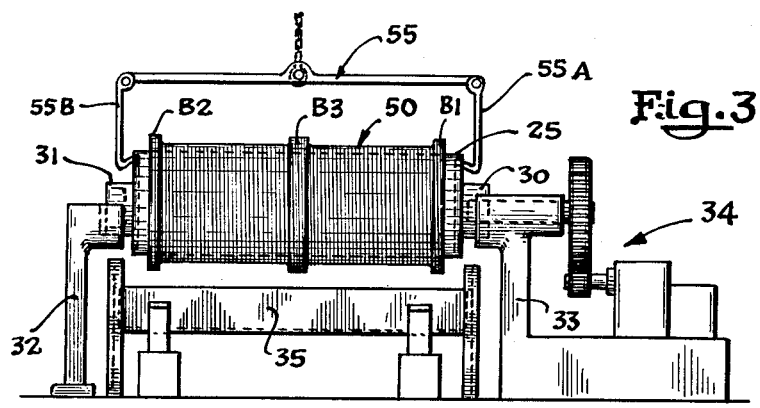
FIG. 3 is a schematic view illustrating the apparatus used in conjunction with manufacture of the container.

The mandrel 25 is to be supported for rotation, and typically this may be accomplished by equipping the mandrel with trunnions 30 and 31, FIG. 3, adapted to be supported in upright bearing mounts as 32 and 33. Rotation is imparted to the drum 25 as by a motor-driven gear train 34. The arrangement is such that the mandrel is thus supported for rotation in an elevated position above a pan or tub 35 which contains the necessary amount of a bonding resin or cement 36, FIG. 9, of which numerous varieties can be used including epoxy resins and polyester type bonding cements.

In any event, the supported mandrel having the glass fiber sheet 26 carried thereby is to be rotated with the glass fiber sheet in contact with the bonding cement in the pan 35, and advantageously this is accomplished by elevating the pan 35 as indicated in FIG. 9 to a level where the lower peripheral portion of the glass fiber sheet is submerged therein as shown in FIG. 9. The drum or mandrel is rotated sufficiently long to assure saturation of the sheet 26, and thereafter the pan 35 is lowered to the position shown in FIG. 3.

The mat 26 becomes the liner 21 of the container, and a glass roving 40, typically one containing approximately 260 ends of glass filament, is to be wound under tension about the cement saturated glass fiber sheet spirally from one end of the mat to the other. In the course of thus winding the sheet 26 all cement is expressed in excess of that required for bonding the roving to the mat. Thus, the sheet or liner is in effect compression molded by the roving, resulting in an ultimate thin, dense container body.

The roving 40 is supplied from a reel 41, FIG. 8, and is guided over a plurality of guide rollers 42 upward to a traveling guide or spinner 43 having a nozzle end 44 located proximate to the drum 25. The guide 43 is arranged for travel longitudinally of the drum 25 in a controlled fashion on a guide 45, FIG. 7, so as to establish the displacement that will define the generation of the spiral winding for the roving 40. The apparatus is so designed as to create about one hundred pounds tension or pull on the roving 40 in the course of generating the spiral wrap, thereby compressing the fiberglass sheet between the roving and the molding mandrel.

Referring to FIG. 7, the roving 40 can be started on the mat 26 as by a few turns of the drum 25 in which the guide 43 is reciprocated to produce several rather widely spaced and overlapped turns 46 thereby tightly coiling the roving 40 on the sheet 26. Other techniques can of course be used.

The first bead for the container is generated by maintaining the guide 43 stationary for numerous turns of the drum 25 so that numerous layers of the glass roving are juxtaposed one atop another to form a narrow, first bead B1 of the desired dimension. Thereafter, the guide 43 is maneuvered slowly along the length of the drum incidental to generating the spiral wound casing 22 of a gradually increasing length away from the first bead B1, with the roving windings slightly overlapping one another along the length of the sheet 26.

It is possible under the present invention to produce, in one operation, a compound or complex body 50, FIGS. 3 and 11, from which can be obtained a plurality of barrel-type containers. Thus, referring to FIG. 3, the form or body that is ultimately completed on the mandrel 25 includes not only a pair of remote end beads B1 and B2, formed on the mandrel, but also an intermediate bead B3 which is approximately twice the width of the end beads B1 and B2. All beads of the desired enlarged diameter, in comparison to the tubular section of the container, are built up by rotating the drum with the guide or spinner 43 held stationary on the guide rod 45. It will therefore be recognized from what is shown in FIG. 3 that by cutting the bead B3 midway of the axial length thereof two containers 20 and 20A, FIG. 12, can be ultimately afforded.

After completion of formation of the complex body 50 from which the two containers are to be obtained, the mandrel 25 is bodily removed from the spinning station, FIG. 3, and is transferred to a heat treating station where the epoxy resin is cured, typically at about 300° F. for ten minutes depending upon resin manufacturer's specifications. The transfer of the mandrel bodily is easily accomplished by a hoist 55, FIG. 3, having a pair of arms or tongs 55A and 55B adapted to engage and apply a lifting force to the opposite ends of the mandrel 25.

Once the cement has been cured, the fiberglass sheet and the spiral wound roving thereon are permanently united by the bonding cement. Thereafter, the complex cylindrical body 50 is stripped from the mandrel 25 by stripping apparatus including a stripper in the form of a sleeve or collar 65, FIG. 10, telescoped over the mandrel 25. Thus, the mandrel 25 is supported for the stripping action in any convenient harness. The stripper 65 is positioned against one of the end beads as B1, whereafter hydraulic apparatus 70, including a ram 71 in a cylinder 72 bearing on the stripper 65, is then actuated to move the stripper 65 along the mandrel 25 thereby advancing the cured body 50 off the mandrel 25 and onto a support 73, if desired, although the body 50 can be received manually as well.

Referring to FIG. 11, the stripped body 50 after separation from the molding mandrel is cut along the dotted line medially of the width of the enlarged bead B3 resulting in a pair of identical containers 20 and 20A, FIG. 12, each having an end bead B3′ which is one-half the bead B3. As noted above, each container as 20 in a sixty-five gallon size, is capable of withstanding a bending stress of at least one ton when placed on its side.

Figure 2:
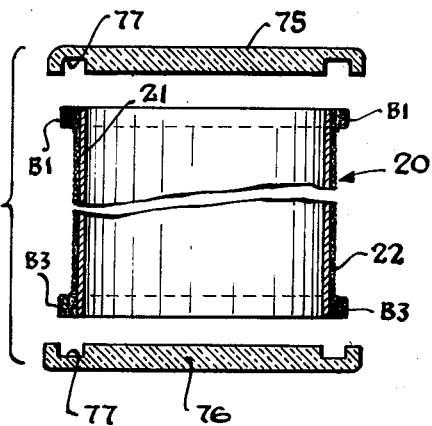
FIG. 2 is an exploded section of the container shown in FIG. 1.

The final step in completing construction of the container as 20 is to round off the outermost edges thereof at R, FIG. 13, to facilitate association therewith of closure caps 75 and 76, FIG. 2. The closure caps 75 and 76 are preferably in the form of molded fiberglass disc-like elements, each provided at the periphery thereof with an annular groove as 77 adapted to receive the related end bead as B1 or B3′ of the container. Advantageously, the bottom cap 76, at least, is cemented in place by a bonding cement.

While the present invention will be manifest in most instances in a truly cylindrical container, it is possible to construct other shapes such as a container of general box-like appearance indicated at 80 in FIG. 14. It will be realized that in constructing the box-like container 80, a mandrel of rectangular cross-section will be employed. Otherwise the techniques are similar to what has been described above.

It will be seen from the foregoing that it is possible under the present invention to produce bonded compression molded containers entirely of fiberglass with the exception of that small amount of bonding cement necessary to bond the roving casing to the sheeted liner. Such a container can be used for food products, agricultural chemicals and the like. Inasmuch as the liner is compression molded, the container as a whole is dense and hence exceptionally strong.

I claim:

1. A process for forming containers from glass fiber comprising: wrapping a mandrel with a sheet of glass fiber to afford the liner for the container, treating the sheet on the mandrel with an uncured cement in a liquid state; winding the treated sheet, while the cement is still in an uncured flowable state, with a length of glass fiber roving under tension to compress the sheet and squeeze therefrom excess cement, said windings substantially abutting one another for the length of the sheet to afford an exterior casing for the ultimate container; and said windings being arranged in multiple turns one atop another at the extreme ends of the sheet on the mandrel and substantially midway of the length thereof to thereby define as many beads of enlarged diameter including two end beads and at least one medial bead, said medial bead being approximately twice the width of the end beads, transferring the mandrel supporting the wound sheet to a curing station where the cement is cured thereby to permanently join the liner and the casing, removing the cured container from the mandrel, and severing the cured container midway of the medial bead.

2. A process according to claim 1 wherein the glass fiber roving is applied to the sheet under a tension of about 100 pounds, and wherein the cement is a resin selected from the group consisting of epoxy and polyester resins.

References Cited by the Examiner

UNITED STATES PATENTS

| | | | |
|---|---|---|---|
| 2,594,693 | 4/52 | Smith | 220—83 |
| 2,614,058 | 10/52 | Francis | 156—171 |
| 2,748,830 | 6/56 | Nash | 156—171 |
| 2,857,932 | 10/58 | Calderwood | 156—171 XR |
| 2,917,102 | 12/59 | Mahady | 156—187 XR |
| 2,991,210 | 7/61 | Matkovich | 156—177 XR |
| 3,010,602 | 11/61 | Randolph | 220—83 |
| 3,047,191 | 7/62 | Young | 220—83 |

EARL M. BERGERT, *Primary Examiner.*

J. DRUMMOND, *Examiner.*